C. A. ROOT.
Foot Cooler and Moistener for Horses.
No. 226,628.                              Patented April 20, 1880.
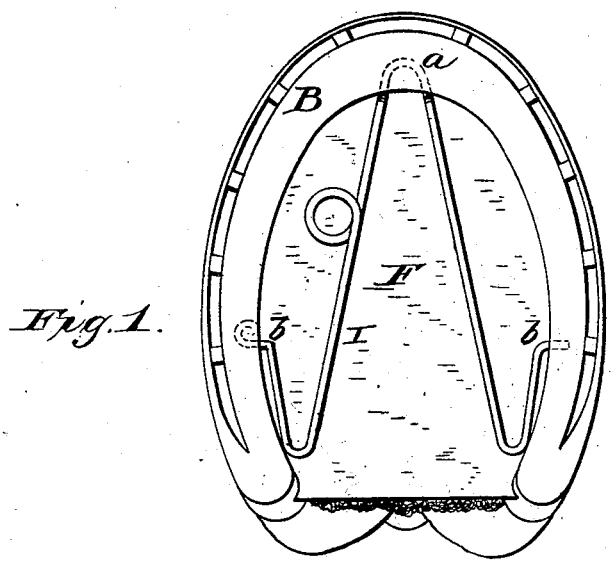
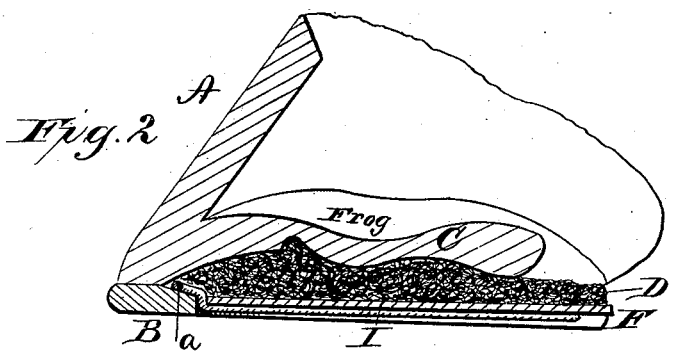
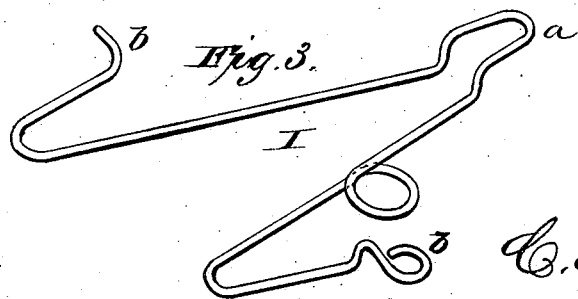

UNITED STATES PATENT OFFICE.

CORYDON A. ROOT, OF ANDOVER, OHIO.

FOOT COOLER AND MOISTENER FOR HORSES.

SPECIFICATION forming part of Letters Patent No. 226,628, dated April 20, 1880.

Application filed September 17, 1879.

*To all whom it may concern:*

Be it known that I, CORYDON A. ROOT, of Andover, in the county of Ashtabula, and in the State of Ohio, have invented certain new and useful Improvements in Foot Coolers and Moisteners; and I do hereby declare that the following is a full, clear, and exact description thereof, reference being had to the accompanying drawings, and to the letters of reference marked thereon, making a part of this specification.

The nature of my invention consists in the construction of a device for keeping a horse's foot cool and moist, as will be hereinafter more fully set forth.

In the annexed drawings, Figure 1 is a bottom view of a horse's foot having my invention applied to it. Fig. 2 is a longitudinal section of the same. Fig. 3 is a perspective view of a spring used in the device.

A represents a horse's hoof, and B is an ordinary horseshoe, fastened thereto in the usual manner. C is the frog of the hoof.

Under and against the frog C is placed a sponge, D, below and against which is placed a piece of leather, F, cut in suitable shape to fit within the shoe. I is a spring made of a single piece of wire and bent in the manner shown in Fig. 3, forming a center projection, $a$, and two side arms, $b\ b$.

After the sponge and leather are placed in position under the hoof the part $a$ of the spring I is inserted at the toe between the hoof and shoe, and the side arms, $b\ b$, are sprung in at the sides, as shown, holding the leather and sponge in place.

This device, besides keeping the foot cool and moist by moistening the sponge, gives an opportunity for a ground pressure on the frog of the foot, thereby removing the strain from the shell of the hoof.

The leather F is to protect the sponge, but is not absolutely necessary.

Having thus fully described my invention, what I claim as new, and desire to secure by Letters Patent, is—

The spring I, constructed, as described, with center projection, $a$, and side arms, $b\ b$, in combination with the sponge D and leather F, applied to a horse's hoof, the parts $a$ and $b\ b$ of the spring adapted to be inserted between the hoof and shoe, substantially as and for the purposes herein set forth.

In testimony that I claim the foregoing I have hereunto set my hand and seal this 4th day of August, 1879.

CORYDON A. ROOT. [L. S.]

Witnesses:
 JOHN ROACH,
 C. L. EVERT.